(12) United States Patent
Poutre

(10) Patent No.: US 6,877,568 B2
(45) Date of Patent: Apr. 12, 2005

(54) TILLAGE SWEEP

(75) Inventor: Benoit Jocelyn Poutre, Elkhart, IA (US)

(73) Assignee: Deere & Company, Moline, IL (US)

( * ) Notice: Subject to any disclaimer, the term of this patent is extended or adjusted under 35 U.S.C. 154(b) by 103 days.

(21) Appl. No.: 10/244,299

(22) Filed: Sep. 13, 2002

(65) Prior Publication Data
US 2004/0060716 A1 Apr. 1, 2004

(51) Int. Cl.$^7$ .............................................. A01B 39/20
(52) U.S. Cl. ...................................... 172/730; 172/770
(58) Field of Search ............................... 172/765, 770, 172/772.5, 730, 721–726, 732, 733, 681

(56) References Cited

U.S. PATENT DOCUMENTS

| 422,718 A | * | 3/1890 | Cameron |
| 1,144,039 A | * | 6/1915 | Johnson |
| 1,648,843 A | * | 11/1927 | Francis |
| 4,583,599 A | | 4/1986 | Anderson .................... 172/730 |
| 4,787,462 A | | 11/1988 | Nichols ....................... 172/730 |
| 5,176,209 A | * | 1/1993 | VandenBrink .............. 172/770 |
| 6,289,996 B1 | * | 9/2001 | Parish ......................... 172/730 |

OTHER PUBLICATIONS

Photo of Herschel Adams sweep, one page, date unknown.

* cited by examiner

Primary Examiner—Christopher J. Novosad

(57) ABSTRACT

A tillage sweep includes an elongated nose portion having forward cutting edges which are straight and diverge at an angle of approximately 45 degrees from a leading point. The top of the nose viewed from the side is straight and angles upwardly at an angle of approximately eleven degrees from the planar bottom surface to juncture with a stem or connecting portion which forms an angle of about 46 degrees with the plane of the bottom surface. The sweep includes outer wing portions with the cutting edges which are straight and which diverge at an angle of approximately 67 degrees thereby forming an angle of about 11 degrees with the respective forward cutting edges. The overall length of the sweep is greater than the width.

20 Claims, 2 Drawing Sheets

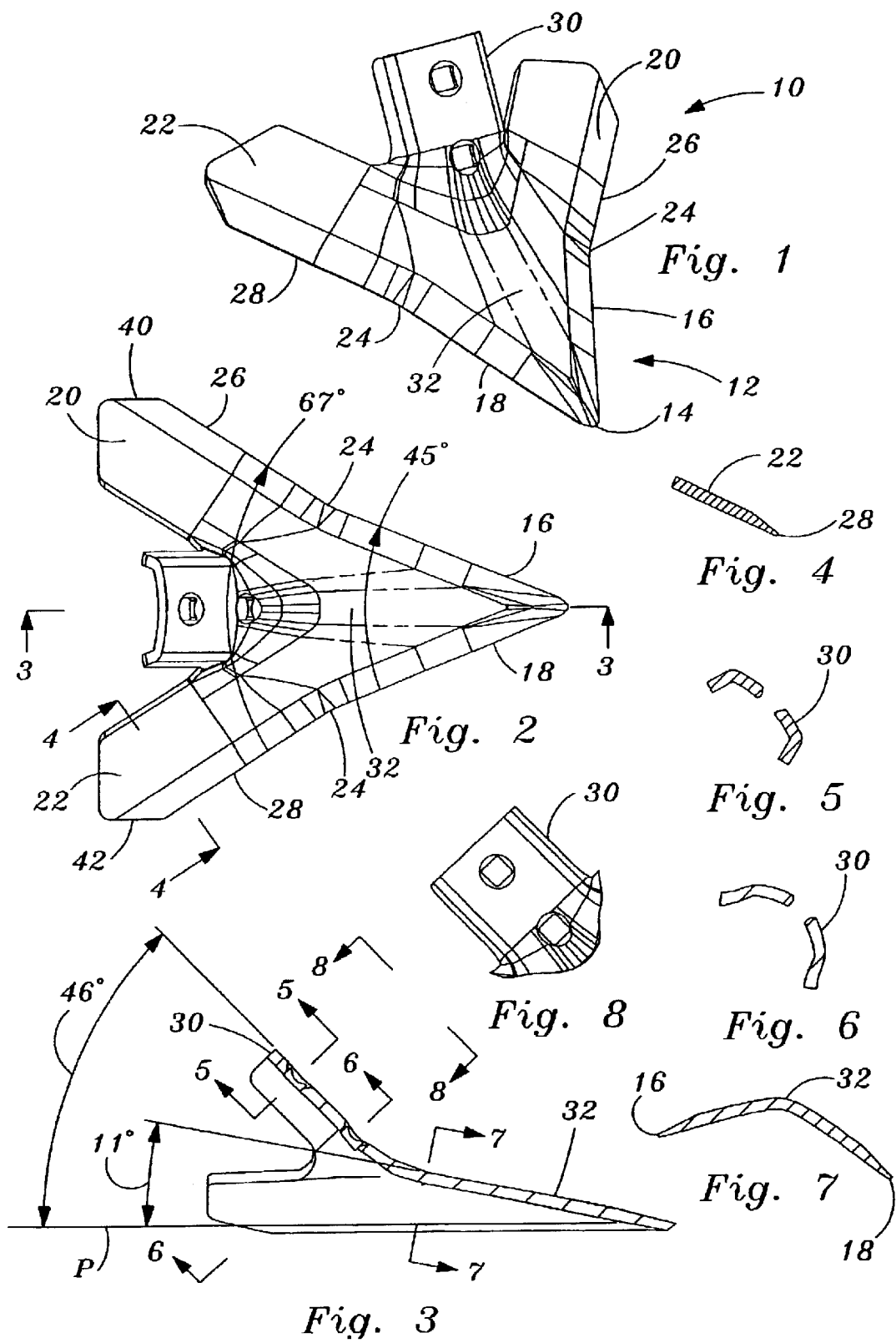

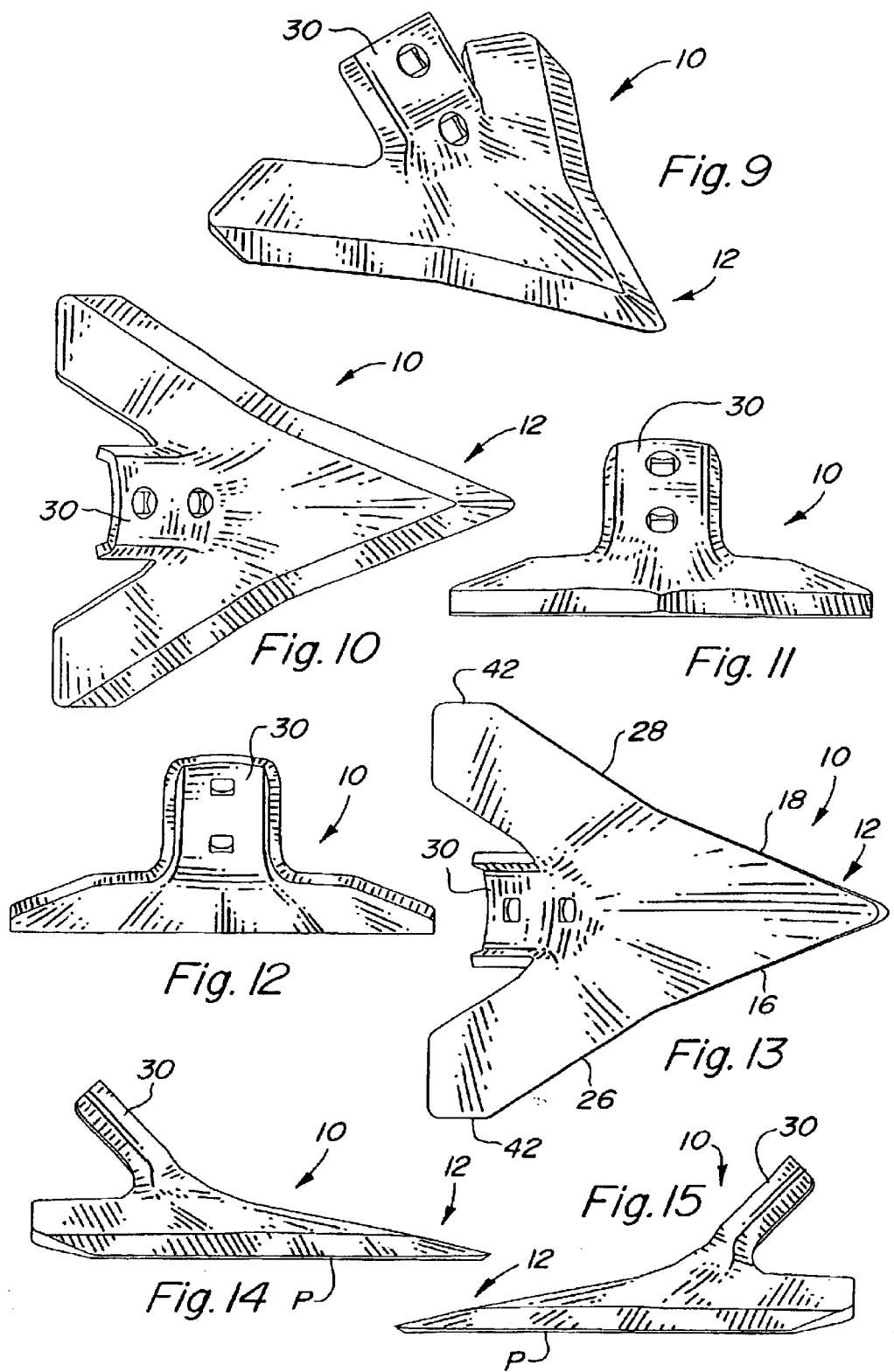

TILLAGE SWEEP

FIELD OF THE INVENTION

The present invention relates to deep tillage tools for agricultural implements such as field cultivators, and more specifically to a sweep for such implements.

BACKGROUND OF THE INVENTION

Tillage sweeps for agricultural implements such as field cultivators and similar ground working implements typically include rearwardly angled wings extending outwardly from a forward sweep. A centrally located stem portion attaches to the lower end of a curve shank. The soil entry, penetration, draft, wear and soil working characteristics of a sweep are determined by the geometry of the sweep. As the sweep wears, these characteristics can change drastically and adversely affect the sweep operation.

Some presently available sweeps have leading sweep angles which are inadequate to allow tool penetration in hard and/or tight soils. As a result, operators may adjust the machine out of an optimal level working condition to get the sweeps to enter and remain in the hard or tight soils. This improper adjustment of the machine results in deteriorated cultivating action and premature sweep wear. Inconsistent depth can also result from the lack of a vertical force urging the sweep into the soil.

Wear life of the sweeps is often limited by a change in shape with wear. Therefore, the sweeps may have to be replaced before they are fully worn away. The working width of many sweeps decreases with wear, which results in the need to replace sweeps before they are fully worn.

SUMMARY OF THE INVENTION

It is therefore an object of the present invention to provide an improved tillage sweep. It is a further object to provide such a sweep which overcomes one or more of the above problems.

It is another object of the present invention to provide an improved sweep designed to provide a wear pattern that better maintains the basic shape of the sweep as it wears. It is a further object to provide such a sweep which has improved soil operating characteristics. It is yet another object to provide such a sweep which lasts longer than most or all of the previously available sweeps while maintaining an effective working width, relatively low draft requirements, and soil penetrating abilities over substantially all of its wear life.

It is still another object of the present invention to provide an improved tillage sweep for a field cultivator or similar agricultural implement which has improved penetration ability when compared to at least most previously available sweeps. It is another object to provide such a sweep which has a pleasing appearance.

A sweep set forth in the description which follows includes an elongated nose portion having forward cutting edges which are straight and diverge at an angle of approximately 45 degrees from a leading point. The top of the nose viewed from the side is straight and angles upwardly at an angle of approximately eleven degrees from the planar bottom surface to a juncture with a stem or connecting portion which forms an angle of around 46 degrees with the plane of the bottom surface. The sweep includes outer wing portions with leading cuffing edges which are straight and which diverge at an angle of approximately 67 degrees thereby forming an angle of about 11 degrees with the respective forward cutting edges. The outer wings also have fore-and-aft extending outer edge portions for sweep width retention with wear.

The relatively long nose section with sharp sweep angle provides good soil entry and penetration. Increased sweep length aids in wear life and shape retention with use. Draft force is reduced compared to most previously available cultivator sweeps of comparable working width.

These and other objects, features and advantages of the present invention will become apparent to one skilled in the art upon reading the following detailed description in view of the drawings.

BRIEF DESCRIPTION OF THE DRAWINGS

FIG. 1 is a perspective view of a sweep.

FIG. 2 is a top view of the sweep of FIG. 1.

FIG. 3 is a view taken substantially along lines 3—3 of FIG. 2.

FIG. 4 is a section view of the outer wing portion taken along lines 4—4 of FIG. 2.

FIG. 5 is a section view of the upper portion of the sweep stem taken along lines 5—5 of FIG. 3.

FIG. 6 is a section view of the lower portion of the stem taken along lines 6—6 of FIG. 3.

FIG. 7 is a section view taken along lines 7—7 of FIG. 3.

FIG. 8 is a view of the stem portion taken generally along lines 8—8 of FIG. 3.

FIG. 9 is another perspective view of the sweep.

FIG. 10 is another top view of the sweep.

FIG. 11 is a front view of the sweep.

FIG. 12 is a rear view of the sweep.

FIG. 13 is a bottom view of the sweep.

FIG. 14 is a right side view of the sweep.

FIG. 15 is a left side of the sweep.

DETAILED DESCRIPTION

Referring now to the drawings, which are drawn generally to scale, therein is shown a field cultivator sweep 10 adapted for connection to a shank attached to an implement frame (not shown) in a conventional manner for forward movement through the soil. The sweep 10 includes an elongated leading nose portion 12 having a forward point 14 and straight leading cutting edges 16 and 18 diverging at an angle less than 50 degrees. Rear wings 20 and 22 diverge from the rear of the nose portion 12 at locations 24 and include straight cutting edges 26 and 28 which diverge at an angle with respect to each other of less than 75 degrees (67 degrees as shown). At the aft end of the nose portion 12 and centrally located between the wings 20 and 22, an apertured connecting or stem portion 30 projects upwardly and rearwardly for receipt by the shank. The stem portion 30 may be attached to the shank in any conventional manner, including the insertion of bolts through the apertures in the stem and shank or the wedging of the stem on a knock-on adaptor.

As shown in the figures, the length of the sweep 10 is greater than the width and is longer than many conventional sweeps, in part because of the extended nose portion 12 with a relatively small sweep angle. Sweep angle or the angle formed by the intersection of the leading cutting edges 16 and 18 (FIG. 2) is approximately 45 degrees. As shown, the edges 16, 18 and 26, 28 lie generally along a common plane (P of FIG. 3). The nose portion 12 includes an uppermost surface or apex 32 which is generally straight and forms an angle of less than 15 degrees (approximately 11 degrees as shown) with the plane P. The stem portion 30 extends upwardly and rearwardly from the nose portion 12 at an angle of approximately 46 degrees.

The juncture of the edges 16, 26 and 18, 28 at locations 24 define obtuse angles which are greater than 160 degrees and, in the example shown, are approximately 169 degrees. The locations 24 are slightly forward of the leading portion of the stem portion 30 and are approximately central with respect to the overall length of the sweep 10. The length of the edges 16 and 18 are at least 20% greater than the lengths of the edges 26 and 28. The wings include side edges 40 and 42 extending in the fore-and-aft direction from the edges 26 and 28 for width retention with wear. In the embodiment shown, the length of the sweep 10 is approximately 10% greater than the overall width of the sweep.

The edges 16, 26 and 18, 28 are beveled and provide a self-sharpening effect with wear. The top surfaces of the sweep nose portion extending outwardly from the apex 32 to the beveled edges are generally planar as are the tops of the wings 20 and 22. Areas subject to the highest wear may be plated or otherwise hardened or coated to extend wear life.

Having described the preferred embodiment, it will become apparent that various modifications can be made without departing from the scope of the invention as defined in the accompanying claims.

I claim:

1. A tillage sweep adapted for connection to a shank for forward movement through the soil, the sweep comprising: an elongated nose portion having a leading point and forward cutting edges which are straight and diverge at an angle of less than 50 degrees from the leading point, and outer wing portions extending from the nose portion and including leading edges which are straight and form junctures with the forward cutting edges, wherein the leading edges diverge at an angle of less than 75 degrees relative to each other.

2. The sweep as set forth in claim 1 wherein the nose portion includes a top surface which, viewed from a side of the sweep, is straight and angles upwardly at an angle of approximately eleven degrees from the plane to a juncture with a connecting portion.

3. The sweep as set forth in claim 1 wherein the forward cutting edges and leading edges define obtuse angles of greater than 160 degrees.

4. The sweep as set forth in claim 1 wherein the sweep has a width and an overall length greater than the width.

5. The sweep as set forth in claim 1 wherein the forward cutting edges diverge at an angle of approximately 45 degrees.

6. The sweep as set forth in claim 1 wherein the leading edges diverge at an angle of approximately 67 degrees.

7. The sweep as set forth in claim 1 wherein the forward cutting edges and the leading edges have lengths, the lengths of the forward cutting edges being greater than the lengths of the leading edges.

8. The sweep as set forth in claim 1 wherein the sweep includes a stem portion extending upwardly from the nose portion, the stem portion having a forwardmost area located at an aft end of the nose portion and being centered with respect to the sweep.

9. The sweep as set forth in claim 8 including a bottom portion lying generally in a plane, and wherein the stem portion forms an angle of approximately 46 degrees with the plane.

10. The sweep as set forth in claim 8 wherein the junctures are located on opposite sides of the forwardmost area of the stem portion.

11. The sweep as set forth in claim 1 wherein the leading edges diverge at an angle of approximately 67 degrees and form angles of approximately 11 degrees with the forward cutting edges at the junctures.

12. A tillage sweep adapted for connection to a shank for forward movement through the soil, the sweep comprising: an elongated nose portion having a leading point and forward cutting edges which are straight, and outer wing portions extending from the nose portion and including leading edges which are straight and form junctures with the forward cutting edges, wherein the leading and forward cutting edges diverge defining obtuse angles of greater than 160 degrees and wherein the forward cutting edges diverge at an angle of less than 50 degrees from the leading point.

13. The sweep as set forth in claim 12 wherein the nose portion includes a top surface which, viewed from a side of the sweep, is straight and angles upwardly at an angle of approximately eleven degrees from the plane to a juncture with a connecting portion.

14. The sweep as set forth in claim 12 wherein the sweep has a width and an overall length greater than the width.

15. The sweep as set forth in claim 12 wherein the forward cutting edges diverge at an angle of approximately 45 degrees.

16. The sweep as set forth in claim 12 wherein the leading edges diverge at an angle of approximately 67 degrees.

17. The sweep as set forth in claim 12 wherein the forward cutting edges and the leading edges have lengths, the lengths of the forward cutting edges being greater than the lengths of the leading edges.

18. The sweep as set forth in claim 12 wherein the sweep includes a stem portion extending upwardly from the nose portion, the stem portion having a forwardmost area located at an aft end of the nose portion and being centered with respect to the sweep.

19. The sweep as set forth in claim 18 including a bottom portion lying generally in a plane, and wherein the stem portion forms an angle of approximately 46 degrees with the plane.

20. The sweep as set forth in claim 18 wherein the junctures are located on opposite sides of the forwardmost area of the stem portion.

* * * * *